(12) United States Patent
Davies et al.

(10) Patent No.: US 7,242,847 B1
(45) Date of Patent: Jul. 10, 2007

(54) SYSTEMS AND METHODS FOR EDITING VIDEO STREAMS USING A GRID-BASED REPRESENTATION

(75) Inventors: Robert L. Davies, Fremont, CA (US); Boon-Lock Yeo, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/336,256

(22) Filed: Jun. 18, 1999

(51) Int. Cl.
*H04N 5/93* (2006.01)

(52) U.S. Cl. .......................... 386/52; 386/55; 386/125; 715/723

(58) Field of Classification Search .................. 386/1, 386/52, 64, 4, 45, 55, 125, 126; 369/83; 360/13; 345/723; 348/700–703; H04N 5/76, H04N 5/781, 9/79, 5/92
See application file for complete search history.

(56) References Cited

U.S. PATENT DOCUMENTS

| | | | | |
|---|---|---|---|---|
| 5,237,648 A | * | 8/1993 | Mills et al. .................. | 345/723 |
| 5,404,316 A | * | 4/1995 | Klingler et al. ............. | 345/723 |
| 5,510,899 A | | 4/1996 | Kim | |
| 5,537,530 A | * | 7/1996 | Edgar et al. ................. | 345/723 |
| 5,760,767 A | * | 6/1998 | Shore et al. ................. | 345/723 |
| 5,768,466 A | | 6/1998 | Kawamura et al. | |
| 5,802,242 A | | 9/1998 | Kawamura et al. | |
| 5,892,882 A | | 4/1999 | Kuroda et al. | |
| 5,930,446 A | * | 7/1999 | Kanda ......................... | 386/52 |
| 5,982,979 A | * | 11/1999 | Omata et al. ................. | 386/52 |
| 6,137,945 A | * | 10/2000 | McGrath ...................... | 386/52 |
| 6,154,601 A | * | 11/2000 | Yaegashi et al. ............. | 386/52 |
| 6,192,183 B1 | * | 2/2001 | Taniguchi et al. ............ | 386/52 |
| 6,327,420 B1 | * | 12/2001 | Furukawa ..................... | 386/52 |
| 6,345,143 B2 | * | 2/2002 | Kanda ......................... | 386/52 |
| 6,351,765 B1 | * | 2/2002 | Pictropaolo et al. ........ | 345/723 |
| 6,404,978 B1 | * | 6/2002 | Abe ............................ | 386/55 |

(Continued)

OTHER PUBLICATIONS

M. Levoy et al. "Light Field Rendering," Proceedings of SIGRAPH 96, Computer Graphics Proceedings, Annual Conference Series, pp. 31-42 (Aug. 1996), Addison Wesley.

(Continued)

*Primary Examiner*—James J. Groody
*Assistant Examiner*—James A. Fletcher
(74) *Attorney, Agent, or Firm*—Blakely, Sokoloff, Taylor & Zafman LLP (57) ABSTRACT

In some embodiments, the invention includes a method of editing a video stream. The method includes storing segment frame icons representing segments of the video stream, the segment frame icons having a layout. The method further includes displaying at least some of the segment frame icons and responding to signals from a user input device by changing the layout of the segment frame icons. In some embodiments, the segment frame icons are arranged in a two-dimensional grid. The segment frame icons may include an image derived from a representative frames of the segments. Changing the layout may involve one or more of the following: re-arranging an order of the segment frame icons in the layout, deleting at least one of the segment frame icons, and adding at least one segment frame icon from another video stream. The segment frame icons may be shot frame icons representing shots of the video stream. The segment frame icons may be subshot frame icons representing subshots of shots of the video stream. Other embodiments are described and claimed.

24 Claims, 7 Drawing Sheets

U.S. PATENT DOCUMENTS 6,411,771 B1 * 6/2002 Aotake .................... 386/52

OTHER PUBLICATIONS

S. Gortler et al. "The Lumigraph," Proceedings of SIGRAPH 96, Computer Graphics Proceedings, Annual Conference Series, pp. 43-54 (Aug. 1996), Addison Wesley.

B. Yeo et al. "Rapid Scene Analysis on Compressed Video," IEEE Transactions on Circuits and Systems for Video Technology, vol. 5, No. 6, Dec. 1995, pp. 533-544.

* cited by examiner

| Name | | | | | | | |
|---|---|---|---|---|---|---|---|
| SF7 | SF8 | SF9 | SF10 | SF11 | SF12 | SF13 | |
| 3:45 | 4:18 | 5:15 | 5:48 | 6:19 | 7:01 | 7:39 | |
| SF14 | SF15 | SF16 | SF17 | SF18 | SF22 | SF19 | |
| 8:43 | 9:19 | 9:37 | 10:48 | 11:23 | 12:03 | 12:50 | 50 |
| SF20 | SF21 | SF23 | | | | | |
| 13:29 | 14:10 | 15:05 | | | | | |

FIG. 6

| Name | | | | | | | |
|---|---|---|---|---|---|---|---|
| SF0 | SF1 | SF2 | SF3 | SF4 | SF5 | SF6 | |
| 0:00 | 0:41 | 1:18 | 2:02 | 2:33 | 3:01 | 3:17 | |
| SF7 | SF9 | SF22 | SF10 | SF11 | SF12 | SF13 | |
| 3:43 | 4:14 | 5:01 | 5:48 | 6:03 | 6:50 | 7:46 | 90 |
| SF14 | SF15 | SF16 | | | | | |
| 8:29 | 9:46 | 10:08 | | | | | |

SYSTEMS AND METHODS FOR EDITING VIDEO STREAMS USING A GRID-BASED REPRESENTATION

BACKGROUND OF THE INVENTION

1. Technical Field of the Invention

The present invention relates to systems and methods for editing video streams. Segments (e.g., shots or subshots) of the video streams are represented by icons which include an image derived from one of the frames of the corresponding segment.

2. Background Art

Video recording has become extremely popular. Traditionally, video tape has been used to record video streams. A video stream is a sequence of frames. In many cases, a VCR (video cassette recorder) is used to playback the video tape. More recently, computers, such as personal computers, have been used to edit video signals. Video editing software is commercially available. For example, the Adobe Premiere™ editor sold by Adobe Systems Incorporated allows a user to edit frames of a video stream by deleting, adding, and re-arranging the order of frames. Some of the frames of the video to be edited (called source clips) are displayed serially in a row in a window on a computer display. The user selects at least some of the source clips for inclusion in an edited footage section, which is displayed below the source clips in the window. The edited video section is initially empty and added to from one or more sources.

The term "shot" is used in the present disclosure. As used herein, the term shot means a portion of a video stream representing an event or a related continuous sequence of actions. The shot may end even though the camera does not stop capturing video signals. Shots often have a particular theme. For example, in a video stream of a child's birthday party, playing a game may be one shot, singing "Happy Birthday" may be another shot, and opening presents may be still another shot, whether or not the camera stops recording between shots. Various techniques have been developed to detect the beginning and ending of shots. For example, techniques for shot detection are described in B. Yeo et al. "Rapid Scene Analysis on Compressed Video," IEEE Transactions on Circuits and Systems For Video Technology, Vol. 5, No. 6, December 1995.

In the Adobe Premiere™ editor, not every frame of the video stream to be edited is visually displayed in the window. Rather, according to the user's designation, for example, only one frame is selected by the editor to be displayed for every N frames in the video stream or only one frame is selected for a particular time interval (e.g., one frame a second). The editor does not make a selection of which frames are to be displayed based on shots that may be included in the video stream.

SUMMARY OF THE INVENTION

In some embodiments, the invention includes a method of editing a video stream. The method includes storing segment frame icons representing segments of the video stream, the segment frame icons having a layout. The method further includes displaying at least some of the segment frame icons and responding to signals from a user input device by changing the layout of the segment frame icons.

In some embodiments, the segment frame icons are arranged in a two-dimensional grid. The segment frame icons may include an image derived from a representative frames of the segments. Changing the layout may involve one or more of the following: re-arranging an order of the segment frame icons in the layout, deleting at least one of the segment frame icons, and adding at least one segment frame icon from another video stream. The segment frame icons may be shot frame icons representing shots of the video stream. The segment frame icons may be subshot frame icons representing subshots of shots of the video stream.

Other embodiments are described and claimed.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

A. Overview

The present invention relates to systems and methods for editing video streams. Segments of the video streams are presented by segment frame icons. A segment is a contiguous sequence of frames of the video stream. A shot is one type of segment. A subshot (discussed below) is another. A scene, which is a contiguous sequence of shots unified by a common event or them, is another type of segment. The icons have a layout on the display or a window in the display. The icons may be presented in a two-dimensional arrangement, such as a grid with rows and columns. The order in which segments are displayed after editing is related to the layout of the icons. Therefore, the video stream may be edited by changing the layout through re-arranging the order of icons in the layout (which re-arranges the order of display of the corresponding segments in the video stream), deleting icons from the layout (which deletes corresponding segment from the video stream), and adding icons from another video stream (which adds the corresponding segments to the video stream from the other video stream). Merely changing the width of a window or size of icons so that more icons will fit in a row does not change the layout for purposes of the present invention. Although in that case, the displayed icons may look different on a display, the displayed video stream will not look different.

In the following description, shots and subshots will be discussed. However, the words "segment" and "subsegment" could replace the terms "shot" and "subshot" throughout.

Editing may be performed through a user input device, such as a mouse, through a drag and drop or delete and paste procedure. Shots may also be copied, without deletion. In this respect, in contrast to the prior art, the invention is analogous to a word processor program in which portions of text may be moved, deleted, or added. The browsing and editing features of the invention are intuitive and easy to use. Selected frames from within a shot may be presented in a window and edited in similar fashion. That is, frames within a shot may be edited by re-arranging the order of frames in the shot, deleting frames from the shot, and adding frames from another shot (which may be simultaneously displayed).

Figure 1:
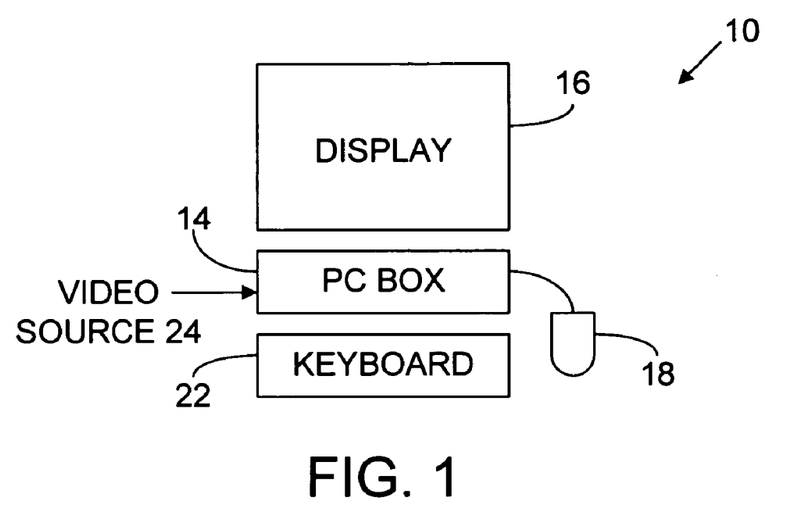
FIG. 1 is a block diagram representation of a computer system that may be used in connection with some embodiments of the invention.

Referring to FIG. 1, a computer system 10 is illustrated as a desk top personal computer, but may be any of a variety of other computers including a portable computer (e.g., laptop), a set top box and a television, a network computer, a mainframe computer, etc. Computer 10 includes chassis 14, a monitor display 16, a mouse 18, and a keyboard 22. Display 16 may be integrated to chassis 14. A video source 24 provides video streams to electronic components in chassis 14. The video streams may be provided in a variety of ways including through a serial conductor directly from a camera, a disc, a modem directly from another computer or through the Internet, or other means.

Figure 2:
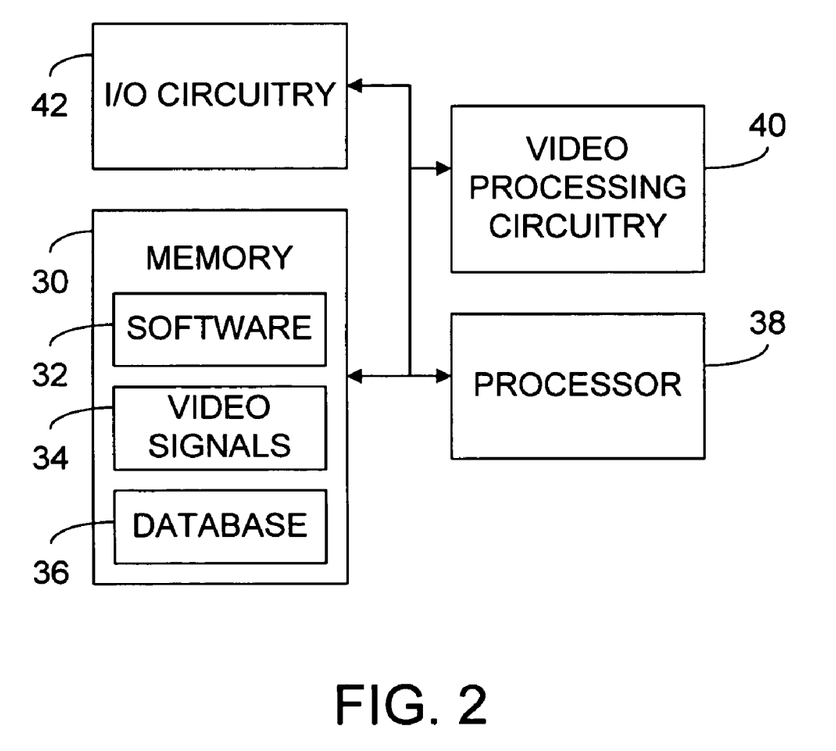
FIG. 2 is a high level schematic block diagram representation of some components of the computer system of FIG. 1.

FIG. 2 illustrates some of the components in chassis 14 in a high level schematic form. Referring to FIG. 2, a memory 30 represents a variety of memory including, for example, a hard drive, main memory, video memory (e.g., video static random access memory (VSRAM)), and a compact disc (CD), if used (which are examples articles including a computer readable medium). For example, memory 30 includes software 32 and video stream signals 34. Memory 30 may also include a database 36 to hold video document detail information and associated query and display software. Software, video stream signals, and other signals, such as control signals, are processed by a processor 38 with the assistance of video processing circuitry 40. Input/output (I/O) circuitry 42 interfaces between the other components of FIG. 2 and, for example, user input devices (e.g., mouse 18 and keyboard 22) and display 16. Again, FIG. 2 is intended to be a high level schematic representation and the invention is not restricted to the particular details therein.

B. Exemplary Windows

Figure 3:
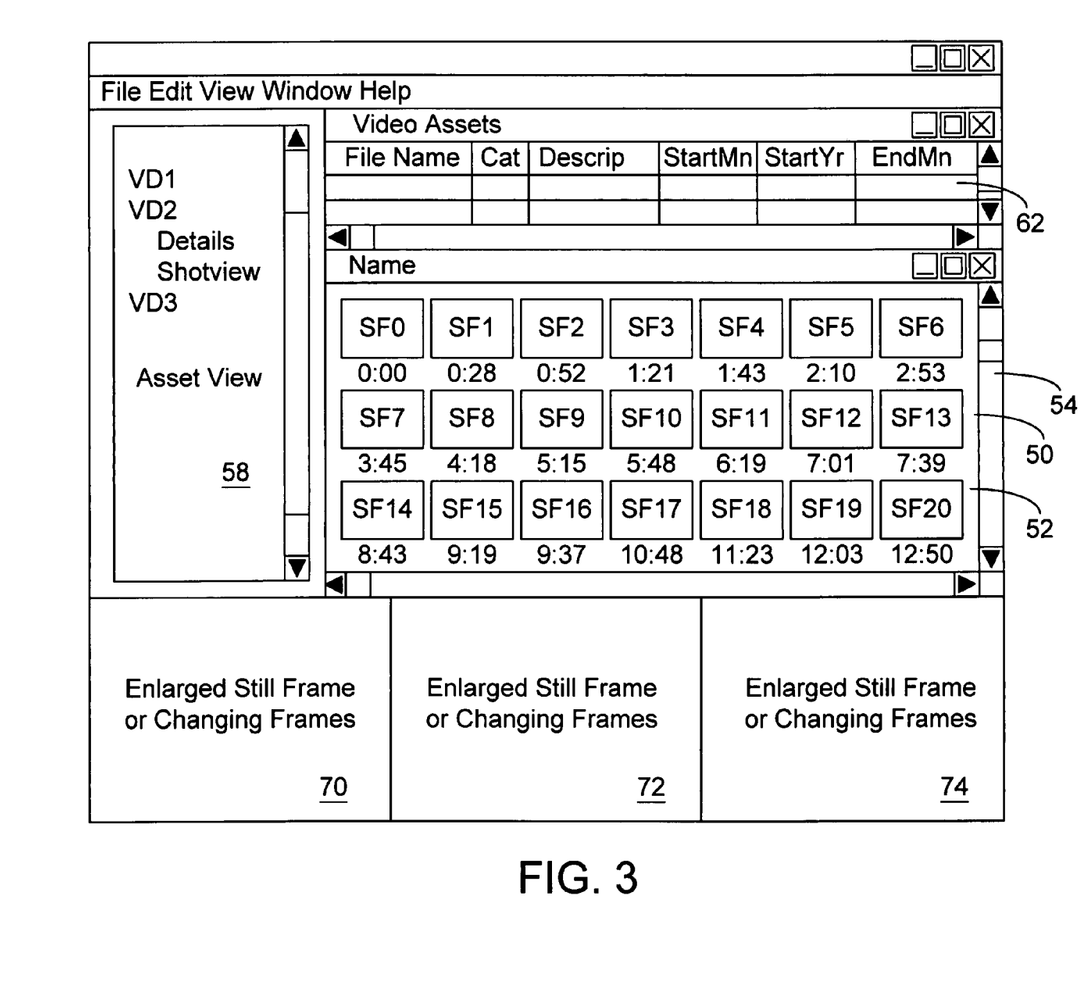
FIG. 3 illustrates windows on a display according to some embodiments of the invention.

The following describes windows and other representations in a screen capture in a display, such as display 16 of FIG. 1 according to some embodiments. However, the invention is not restricted to these details. Referring to FIG. 3, a shot view window 50 includes a shot view of a video stream. Shot view 52 includes multiple shot frame icons SF0, SF1, . . . SF20. The order of the shot frame icons matches the order in which the corresponding shots are played. Therefore, if the order of the shot frame icons is changed through editing, the order the corresponding shots will be played following editing will change accordingly.

Each of the shot frame icons is a visual representation of a shot. For example, a shot frame icon may include one of the frames of the corresponding shot. However, the amount of detail in the image in the shot frame icon may be substantially less that in the frame it is derived from because of the size difference. The frame to which the shot frame icon corresponds may be called a key frame. (Note that in FIG. 3, the frame icons show a symbol (e.g., FS0) rather than an image because of the size constraints of patent figures.) The key frame could be the first frame of the shot. However, it has been found that the first frame is often a transitional frame and is not particularly representative of the shot. Selecting another frame, such as a middle frame of the shot or a frame X frames following the first frame may be more representative of the shot. The frame icons are referred to as frame icons because they can be selected through a user input device similar to the way icons in a graphical user interface are typically selected (e.g., through a clicking of a mouse). Examples of user input devices include but are not limited to a mouse, joystick, trackball, keyboard, light pen, touch pad, touch screen, gesture recognition mechanism, etc.

A number is shown below each shot frame icon. The number may indicate a time of the shot represented by the icon with respect to the beginning video document that includes the shot. The number could represent a time of the beginning of the video document or beginning of the shot to the keyframe. The number may represent something else such as a shot order or the duration of the shot. More than one number could be shown per icon.

An asset view window 58 includes a list of video documents (e.g., VD1, VD2, VD3) that may be selected for editing. Video document VD2 is illustrated as including a Details and a Shot view file. The other video documents may include similar files.

A video asset detail window 62 may display a file name, category (e.g., vacation, birthday parties, etc.), description, start month, start year, and end month information for multiple video documents. The start and end month are the months the video begins and ends. (Of course, not each of these fields is required, and the video documents do not have to have information for each field.) The information can be entered manually or otherwise.

There are at least three ways in which video asset detail window 62 may be used. First, detail window 62 may be a directory of all video documents currently maintained by the system. Second, if a video document is selected from asset view window 58, the associated details of that video document may be displayed and/or highlighted. Third, a database (such as database 36 in FIG. 2) may be kept of details of all video documents. Software 32 could include query software through which queries of details of the database may be made. For example, a query could be made for all video documents that include a start or end month in the year 1995. Details of video documents meeting the request could be displayed in detail window 62. A variety of other requests could be made (e.g., all video documents mentioning grandparents in a description field). This is extremely useful in organizing video documents.

Enlarged windows 70, 72, and 74 each may be used to display a still frame of a selected shot or changing frames of a video stream of the selected video document. A video stream associated with a selected shot may be played from start to end of the video stream, or could be played starting from the selected shot to the end or until the user indicates that the video stream is to stop. Thus, in some embodiments, random access into the video stream is used. Further, in some embodiments, the user may be able to control whether the video stream displayed in windows 70, 72, or 74 moves forward, backward, or pauses (and perhaps the speed of frame change) through a user input device (e.g., mouse 18). Having multiple windows 70, 72, and 74 allows the user to view video streams of previous video documents or/and enlargements of different shot frame icons. More than three windows may be included.

C. Shot Editing Process

In FIG. 3, shot frame icons SF0, SF1 . . . SF20 are arranged in a two-dimensional grid arrangement. (Note that the grid is not required to have regular rows and columns and is not required to have the same number of icons in each row and in each column.) The two-dimensional arrangement allows more shots to be available for viewing for easier browsing and editing. The size of window 50 can be changed to allow more icons and the size of the icons can be changed to allows more shots or make viewing of the icons easier. In the case of some video streams, there may be so few shots that there are only one row of shots frame icons.

Shot view window 50 includes a scroll bar 54 that allows the user to display a different portion of the shot view. For example, in FIG. 4, shot frame icons SF7, SF8, . . . SF23 are shown.

Figure 4:
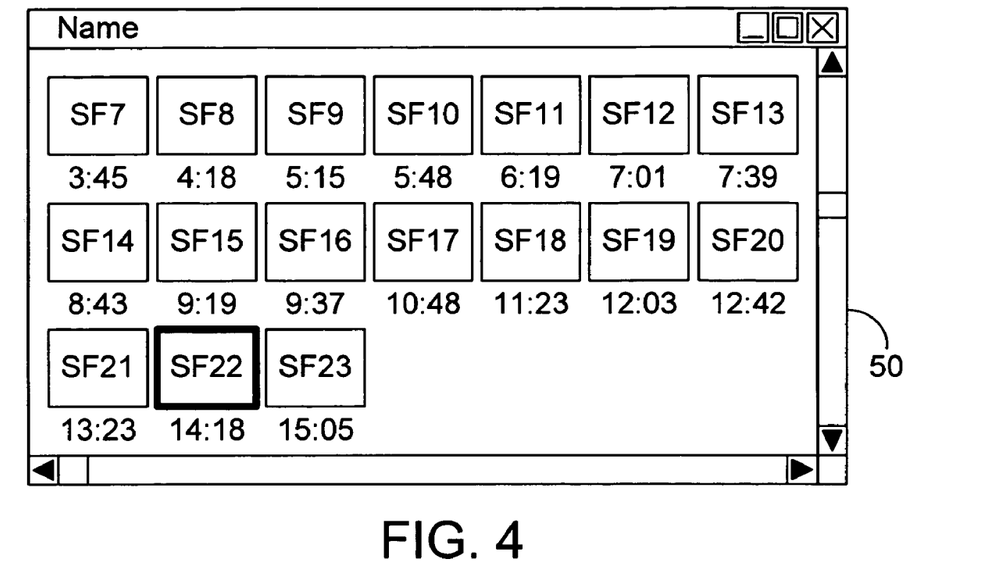
FIG. 4 illustrates a window showing a grid of shot frame icons according to some embodiments of the invention.
Figure 5:
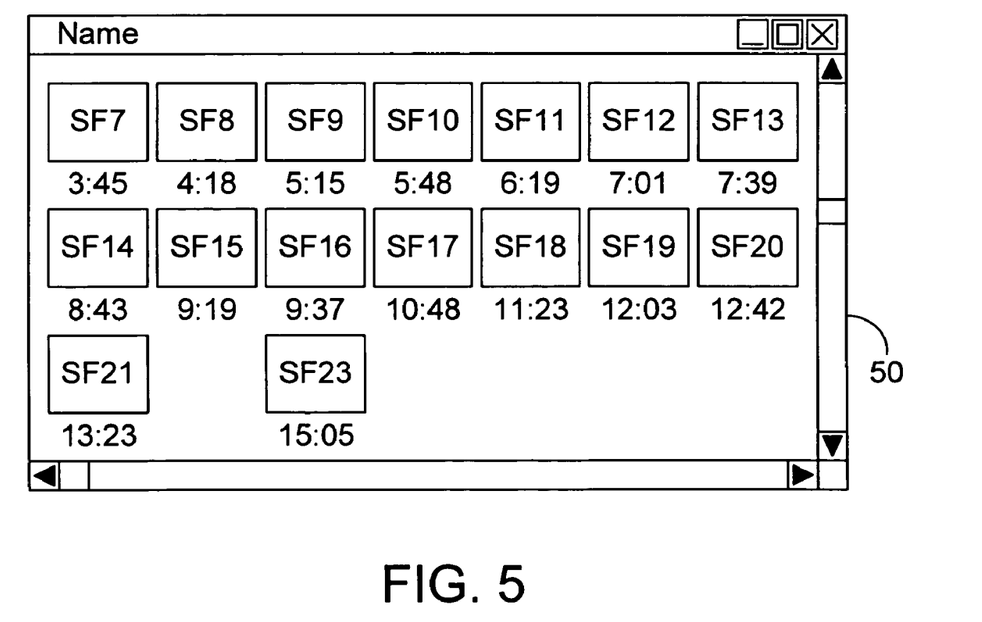
FIG. 5 illustrates a window showing a grid of shot frame icons according to some embodiments of the invention.
Figure 6:
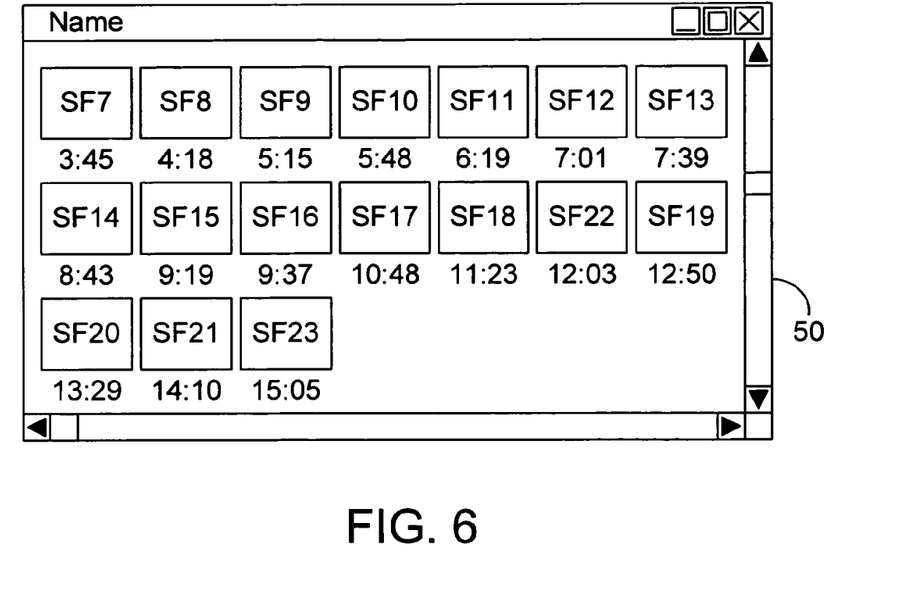
FIG. 6 illustrates a window showing a grid of shot frame icons according to some embodiments of the invention.

FIGS. 4, 5, and 6 illustrate a shot editing process according to some embodiments. For example, suppose the user wanted to move icon SF22 between icons SF18 and SF19, so that when the video stream is played after editing, the shot represented by icon SF18 will be played, followed by the shot represented by icon SF22, followed by the shot represented by icon SF19. Further, the shot represented by icon SF23 will be played immediately after the shot represented by icon SF21. Referring to FIG. 4, icon SF22 is selected to be moved (e.g., through bringing a mouse cursor over the icon and clicking the mouse). A selected icon may be highlighted as shown in FIG. 4 or otherwise indicated. Shot frame icon SF22 is then dragged (if drag and drop editing is used) or deleted (if delete and paste editing is used) as shown in FIG. 5. Finally, in FIG. 6, icon SF22 is inserted between icons SF18 and SF19 and icon SF23 immediately follows icon SF21. Note how the layout of the icons changes between FIGS. 4 and 6. The starting times of the shots represented by icons SF19, SF20, SF21, and SF22 change because of the change in order.

Figure 7:
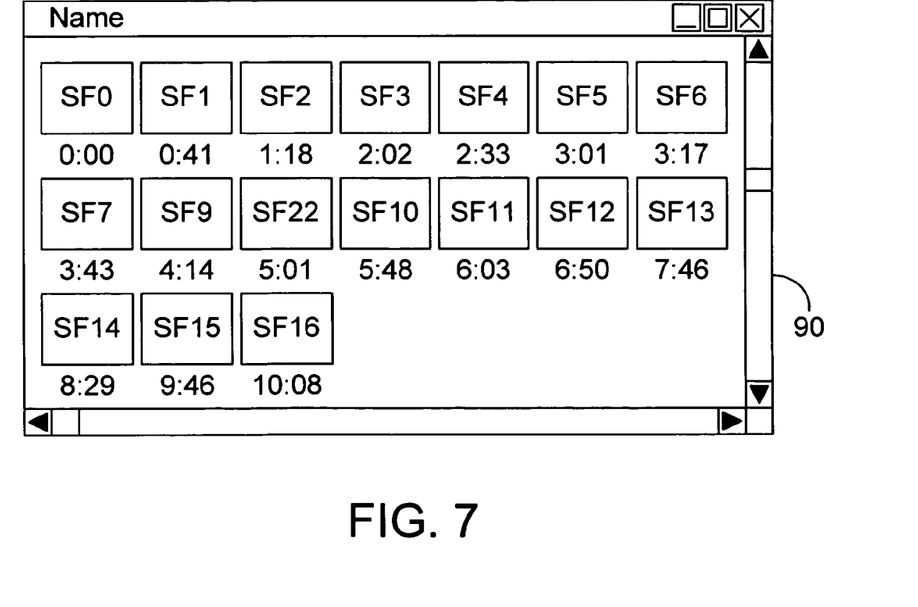
FIG. 7 illustrates a window showing a grid of shot frame icons according to some embodiments of the invention.

The shot icon could be copied or moved to another video stream. For example, FIG. 7 illustrates a window 90 which includes shot frame icons from a different video stream than that of window 50 in FIG. 4. As shown in FIGS. 4 and 7, shot frame icon SF22 from window 50 is copied or moved between shot frame icons SF9 and SF10 in window 90. There might be more than one shot view (set of shot frame icons) in a window, but it could tend to be confusing.

Figure 8:
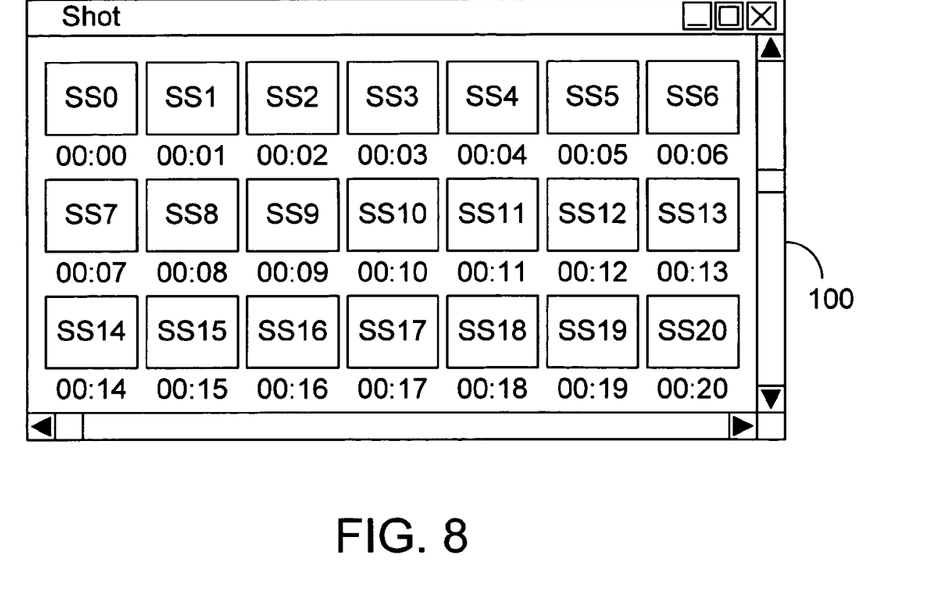
FIG. 8 illustrates a window showing a grid of subshot frame icons according to some embodiments of the invention.

FIG. 8 illustrates a subshot window 100 that includes subshot frame icon SS0, SS1, . . . , SS20. The subshot frame icons representing some frames of a shot (e.g., shot SF1 in FIG. 3). Merely as an example, there may be one subshot frame icon for every second (time) of the shot. A number representing the second of the frame is shown. A number could be shown representing a sequential number of the frame. For example, if every 30th frame was represented, the number could be 0, 30, 60, 90, etc. The numbers could represent other things and there could be more than one number per icon. A user may specify the interval between frames (e.g., one frame per second or one frame per ½ second).

Figure 9:
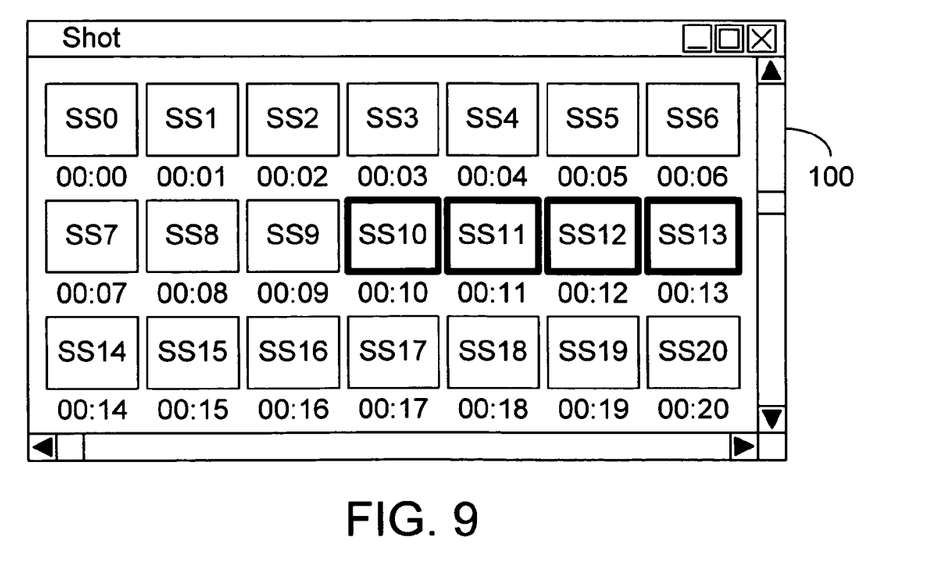
FIG. 9 illustrates a window showing a grid of subshot frame icons according to some embodiments of the invention.
Figure 10:
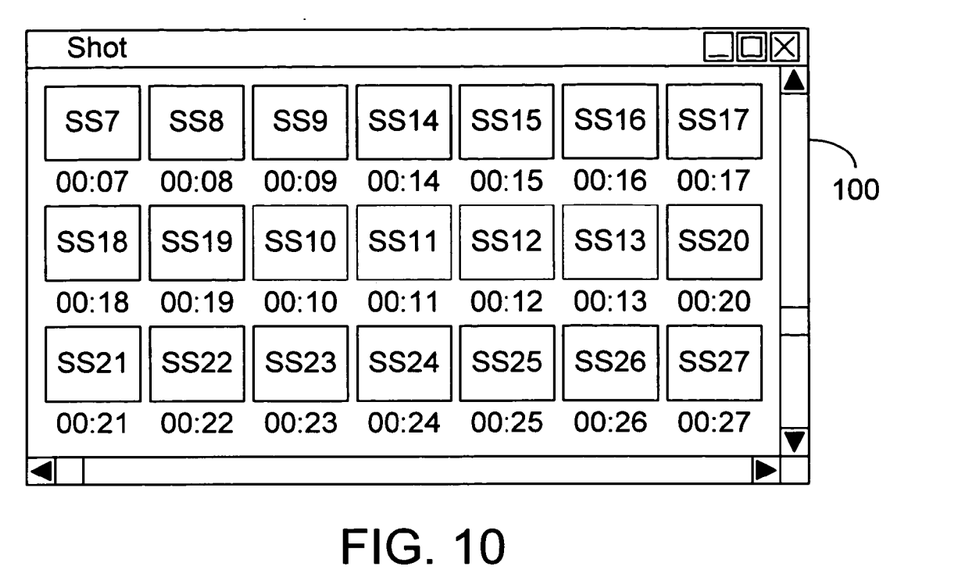
FIG. 10 illustrates a window showing a grid of subshot frame icons according to some embodiments of the invention.

The subshot frame icons can be edited (e.g., re-arranged, deleted, or added to) in similar fashion to the editing of the shot frame icons of the shot views. For example, suppose, the user wanted to move subshot icons SS10—SS13 to between subshot frame icons SS19 and SS20. In FIG. 9, icons SS10–SS13 are selected. They are cut (or copied) and pasted or dragged and dropped to between icons SS19 and SS20 as shown in FIG. 10. Note that when icons SS19 and SS20 are moved, the frames other than the keyframes are also moved with them. (The term moved is not necessarily used literally as explained below.)

Figure 11:
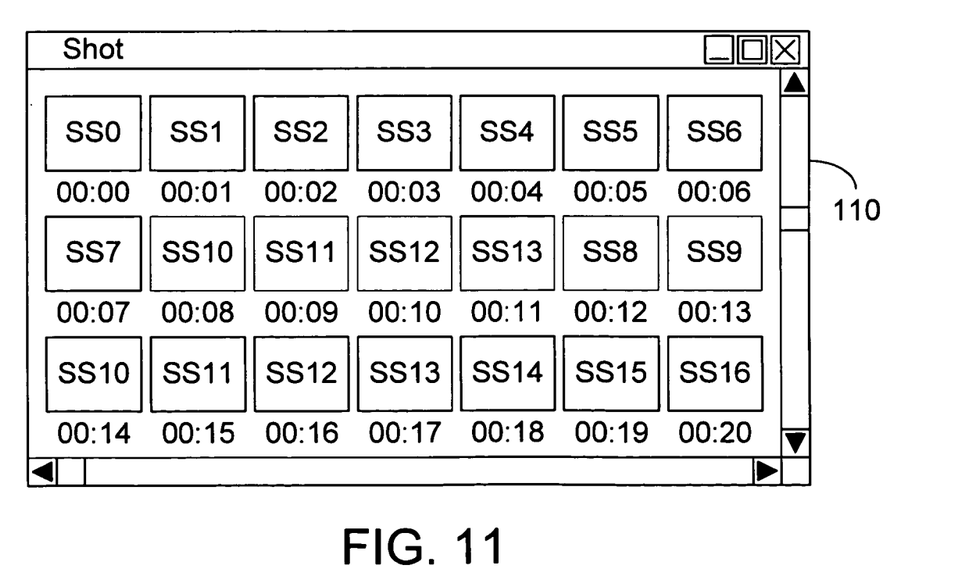
FIG. 11 illustrates a window showing a grid of subshot frame icons according to some embodiments of the invention.

Icons SS10–SS13 of subshot window 100 could be copied to another shot (e.g., shot. SF2 in FIG. 3). For example as shown in FIG. 11, icons SS10–SS13 of window 100 (for shot SF1) are copied between icons SS7 and SS8 of window 110 (for shot SF2).

A window might hold subshot frame icons for more than one shot, but it could tend to be confusing.

If the frame selected to appear in the shot frame icon is not very representative of the shot, a user can select another frame from the subshot frame icons for that purpose.

Using a current video editing software (such as Adobe Premiere) to achieve similar effect is much more time-consuming because they use a frame-based approach. Editing at the shot level is much more intuitive because of, for example, the coherence within a shot.

D. Playback of Edited Video

Following editing, the video stream may be decoded and re-encoded in the new order. However, rather than re-encoding, there might merely be an updating of the underlying data structure of the relative positioning of the shots in the video stream. This process might take only matter of seconds or less.

To support playback of edited video stream without re-encoding, the system requires uses frame-accurate random access by a video decoder in video processing circuitry 40 and memory 30. As an example, suppose a video consists of 3 shots as follows: shot 1 from frame 1 to 300, shot 2 from frame 301 to 600, shot 3 from frame 601 to 900. Suppose during an edit session shot 2 is now moved to the end of the sequence, i.e., after the original shot 3. During the playback of the edited sequence, the following sequence of event happens to the original video:

play frame 1 to frame 300 jump to frame 601 play frame 601 to frame 900 jump to frame 301 play frame 301 to 600 end.

Through frame-accurate random access, seamless playback is possible. This means that preview of the edit may be no different than a final edited video (that has been re-created).

The invention is not restricted to any particular digital format. However, some embodiments of the invention will be described in connection with MPEG (Moving Picture Experts Group) formats. Current and proposed MPEG formats include MPEG-1 ("Coding of Moving Pictures and Associated Audio for Digital Storage Media at up to about 1.5 MBits/s," ISO/IEC JTC 1 CD IS-11172 (1992)), MPEG-2 ("Generic Coding of Moving Pictures and Associated Audio," ISO/IEC JTC 1 CD 13818 (1994); and MPEG-4 ("Very Low Bitrate Audio-Visual Coding" Status:

ISO/IEC JTC 1/SC 29/WG 11, 3/1999). There are different versions of MPEG-1 and MPEG-2. Various formats other than MPEG may be used. The video signals may have interleaved or non-interleaved frames. There may be encoding and decoding of the video signals in additional to the encoding to create the video signal (e.g., discrete cosine transform in MPEG).

The invention may be used with both MPEG-1 and MPEG-2 video formats. In particular, frame accurate random access is made possible through the creation of an indices that facilitate fast random access to arbitrary frame. Merely as an example, using prebuild indices, it can be used to perform a seek to an arbitrary frame of an MPEG-1 video at about $\frac{1}{60}^{th}$ of a second on a personal computer including a Pentium® III processor at 400 MHz. The time represents an average number of seek time measured over intra-frame coded I-frames as well as inter-frame coded P and B frames. For video typically captured at 30 frames/sec, $\frac{1}{60}^{th}$ second for transitioning to an arbitrary position in video is insignificant. As a result, the transition is seamless and not noticeable by the users. To the user, it would appear as if the edited video has been re-encoded before being played back.

E. Fast Random Access of Frames for Reverse Frame-by-Frame Playback of MPEG Video MPEG-1 and MPEG-2 video are made up of three basic frame types: I frames, P frames and B frames. I frames are coded independently of other frames. P frames are coded based on the previous I or P frames. B frames are also known as Bi-directional frames and are coded based on the previous and/or next I or P frames. For MPEG-2 video coded using field coding, B frames may also depend on a different field coded as a B frame. The costs of decompression varies across the different frame types. I frames are cheapest to decode, followed by P frames and then by B frames. To decode P and B frames, motion compensation is required. A B frame is typically more expensive to decode than a P frame because it may depend on two frames whereas a P frame only depends on one frame.

For convenience, the following examples will be described with a 9 frame group of pictures (GOP) (which has 10 frame if the I frame of the next GOP is included). However, the invention is not limited to a particular number of frames in the GOP. For example, a GOP could typically have 15 or 30 frames, or other some other number of frames.

The invention is not restricted to use with frames with any particular resolution or number of bytes. For example, for MPEG1 video (352×240 resolution), the size of one decompressed frame may be ¼ Megabyte (Mbyte) in RGB mode and ⅛ MByte in YUV mode. With greater resolutions, the size can be much greater.

Consider the following pattern of the GOP is the order of displaying frames: I1 (F1), B1 (F2), B2 (F3), P1 (F4), B3 (F5), B4 (F6), P2 (F7), B5 (F8), B6 (F9), I2 (F10). The frame numbers are in parenthesis and the numbers after the frame types are used to distinguish among the different frames with the same encoding type. In contrast to the display order, the encode and decode orders are I1 P1 B1 B2 P2 B3 B4 I2 B1 B2.

1. Random Access

Random access into arbitrary frames of an MPEG video is not straightforward because of frame dependencies. For instance, to access P1, I1 needs to be first decoded; to access B4, which depends on P1 and P2, we will need to first decode I1, P1 and P2.

One approach would be to decode every frame in the GOP so that the needed decoded frames would be available. However, that brute force approach is wasteful. A better approach for random access is to maintain a list of immediate frame dependencies for each frame. The immediate frame dependencies specify the set of frames directly needed for decode operation of the current frame. For the above example, the following are immediate frame dependencies:

I1: none

B1: I1, P1

B2: I1, P1

P1: I1

B3: P1, P2

B4: P1, P2

P2: P1

B5: P2, I2

B6: P2, I2

I2: none (The frame dependencies could be provided by a look-up table, which could be accessed by indices or frame numbers.)

Thus, decoding B5, involves using the decoded P2 and I2 are needed for motion compensation. In addition, decoding P2 involves using the decoded P1, which in return requires the decoded I1. Decoding B5 involves using decoded I1, I2, P1 and P2. Decoding B2 involves using the decoded I1 and P1 for motion compensation; decoding P1 in turns requires decoded I1. B2 therefore requires the decoded I1 and P1. Accordingly, the needed decoded frames are decoded first and stored in memory. Note that in some cases decoded frames will be stored even if they are not going to be displayed themselves, so they will be available in decoding other frames.

2. Frame-by-Frame Backward Playback

Backward (reverse) playback of MPEG video can be straightforwardly implemented using random access techniques. Thus, to access the above 10 frames backward, we could use the random access method above to decode frame 10, then use the random access method to decode frame 9 without taking advantage of the fact that it was already used for decoding frame 10, and so on. This approach, however, does not exploit the temporal coherence of backward decoding. The following is a novel technique to exploit the coherence.

The decoded frames are stored in a decoded frame cache. Various types of memory may be used for the decoded frame cache. Main memory dynamic random access memory (DRAM) is an example. Video random access memory (VRAM) may also be used. A separate memory or section of memory could be dedicated solely to holding the decoded frames. The decoded frame cache does not have to be all in contiguous locations.

The decoded frames cache may be a fixed or variable size. If it is of fixed size it should be large enough to hold the minimum number of decoded frames needed considering the GOPs that may be encountered. The size could dynamically change if the number of frames in the GOP changes. Under one approach, the decoded frames cache is of a fixed size and a when the cache is full, a Least Recently Used (LRU) replacement policy is used to replace the frame that has been least recently accessed. If the cache is not of a fixed size, it could hold a fixed number of frames and a LRU replacement policy could be used.

Using the previous example for a backward decode from frame 10 to 1, the following will happen using the new algorithm on frames 10 to 7:

Frame 10 is the I2 frame. I2 is decoded and stored in the decoded frames cache. Cache=[I2].

Frame 9 is the B6 frame. B6 needs I2, P2, P1 I1. P2, P1, and I1 are decoded. B6 is also decoded. I2 is already in the cache so it does not need to be re-decoded. Decoded P2, P1, I1 and B6 are stored in the cache. Cache=[I2, I1, P1, P2, B6].

Frame 8 is the B5 frame. B5 needs I2 and P2, which are already in the cache. Decode B5 and put in the cache. Cache=[2, I1, P1, P2, B6, B5]

Frame 7 is the P2 frame. P2 needs P1 which is already decoded. Decode P2 and put in cache. Cache=[I2, I1, P1, P2, B6, B5].

Random access can also be more effectively performed using the above described frame caching technique used in backward playback. The key is to use the same caching mechanism for storing recently decoded frames and to re-use these frames if they are requested in the near future. For instance, the following set of frames may be requested to be decoded: I1, B3, B5. To decode B3, both P1 and P2 are needed. As a result, P1, P2 and I1 will be decoded and placed in the decoded frame cache and used from the decoded frame cache if they are already there. In the next request to decode B5, which depends on P2 and I2, only I2 needs to be decoded since P2 is already in the cache.

The caching technique can be performed through hardware or software control. The technique is described in terms of software pseudo code, but can be implemented in hardware or through software according to different pseudo code. That is, there are a variety of ways to implement the cache technique.

Consider the example I1 (F1), B1 (F2), B2 (F3), P1(F4), B3(F5), B4(F6), P2(F7), B5(F8), B6(F9), I2 (F10), mentioned above.

Assume there are the following two functions (1) DecodeCurrentFrame (N, ReferenceSet) and (2) GetDependencyFrameIndex (N).

In DecodeCurrentFrame (N, ReferenceSet), frame N is decoded according to an MPEG algorithm using frame N and the ReferenceSet. The ReferenceSet is the set of referenced frames needed to decode frame N. For example, ReferenceSet for P1 is {frame 1}, ReferenceSet for B4 is {frame 4, frame 7}. A decoded frame N is returned by the function. The decoded frame may be in RGB, YUV, or another format. RGB is used in the example.

In GetDependencyFrameIndex (N), a list of the reference frames that are needed to decode current frame N is obtained. A list of frame index or indices is returned. For example, e.g., GetDependencyFrameIndex (5)={7, 10}.

In the following pseudo code there is a distinction between the index and the actual frame. For example, 10 is an index and frame 10 is the actual frame. There is an array of a data structure called MPEGFrameCache, which is the decoded frame cache. MPEGFrameCache has two attributes: LastTimeUsed (for using in the LRU technique) and FrameRGB.

The following is pseudo-code (lines 1–22) to implement GetFrame( ) using the caching technique according to some embodiments:

```
1   frame GetFrame(N)
2       SetofDependencyIndex = GetDependencyFrameIndex (N)
3       SetofDependencyFrame = { }
4       /* decode frame in the dependency list if needed */
5       /* decoding also forces the frame to go to the decoded frames cache */
6       for each FrameIndex in SetofDependencyIndex do
7           if frame FrameIndex NOT in MPEGFrameCache then
8               /* this call is recursive */
9               Insert GetFrame (Frame) to SetofDependencyFrame
10          else
11              Retrieve frame indicated by FrameIndex from MPEGFrameCache
12              Insert frame indicated by FrameIndex to SetofDependencyFrame
13              Update LastTimeUsed of frame indicated by FrameIndex in
                    MPEGFrameCache
14          end if
15      end for
16      currentFrame = DecodeCurrentFrame (N, SetofDependencyFrame)
17      if MPEGFrameCache is full then
18          Remove element from MPEGFrameCache with oldest LastTimeUsed
19      endif
20      Insert currentFrame to MPEGFrameCache
21      return currentFrame
22  end
```

With respect to the example given above, the following sequence of events happens to decode backward from frame 10. Assume that MPEGFrameCache is initially empty.

```
+ GetFrame (10)
    GetDependencyFrameIndex (10) = { }
    DecodeCurrentFrame (10, { })
    MPEGFrameCache = {frame 10}
+ GetFrame (9)
    GetDependencyFrameIndex (9) = {7, 10}
    Since frame 7 is not in MPEGFrameCache, call GetFrame (7)
    + GetFrame (7)
        GetDependencyFrameIndex(7) = {4}
        Since frame 4 is not in MPEGFrameCache, call GetFrame (4)
        + GetFrame (4)
            GetDependencyFrameIndex (4) = {1}
            Since frame 1 is not in MPEGFrameCache, call
            GetFrame (1)
            + GetFrame (1)
                GetDependencyFrameIndex (1) = { }
                DecodeCurrentFrame (1, { })
                MPEGFrameCache = {frame 1, frame 10}
            DecodeCurrentFrame (4, {1})
            MPEGFrameCache = {frame 1, frame 10, frame 4}
        DecodeCurrentFrame (7, {4})
```

-continued

```
    MPEGFrameCache = {frame 1, frame 10, frame 4, frame
        7}
    Frame 10 is already in MPEGFrameCache
    DecodeCurrentFrame (9, {7, 10})
    MPEGFrameCache = {frame 1, frame 10, frame 4, frame 7, frame
        9}
+ GetFrame (8)
    GetDependencyFrameIndex (8) = {7, 10}
    Both Frame 7 and 10 are in the MPEGFrameCache
    DecodeCurrentFrame (8, {7, 10})
    MPEGFrameCache = {frame 1, frame 10, frame 4, frame 7,
        frame 9, frame 8}
...
```

In the above trace, the LastTimeUsed attribute of MPEG-FrameCache is not indicated. However, the LRU technique could be used. Note that the invention is not limited to an LRU technique.

The frames in MPEGFrameCache are not necessarily ordered. Rather than use a recursive call, the above listed pseudo code (lines 1–20) could be modified to include a loop wherein the terminating condition is that all frames on which frame N is dependent have been decoded and are available for use in decoding frame N.

F. Additional Information and Embodiments

Figure 12:
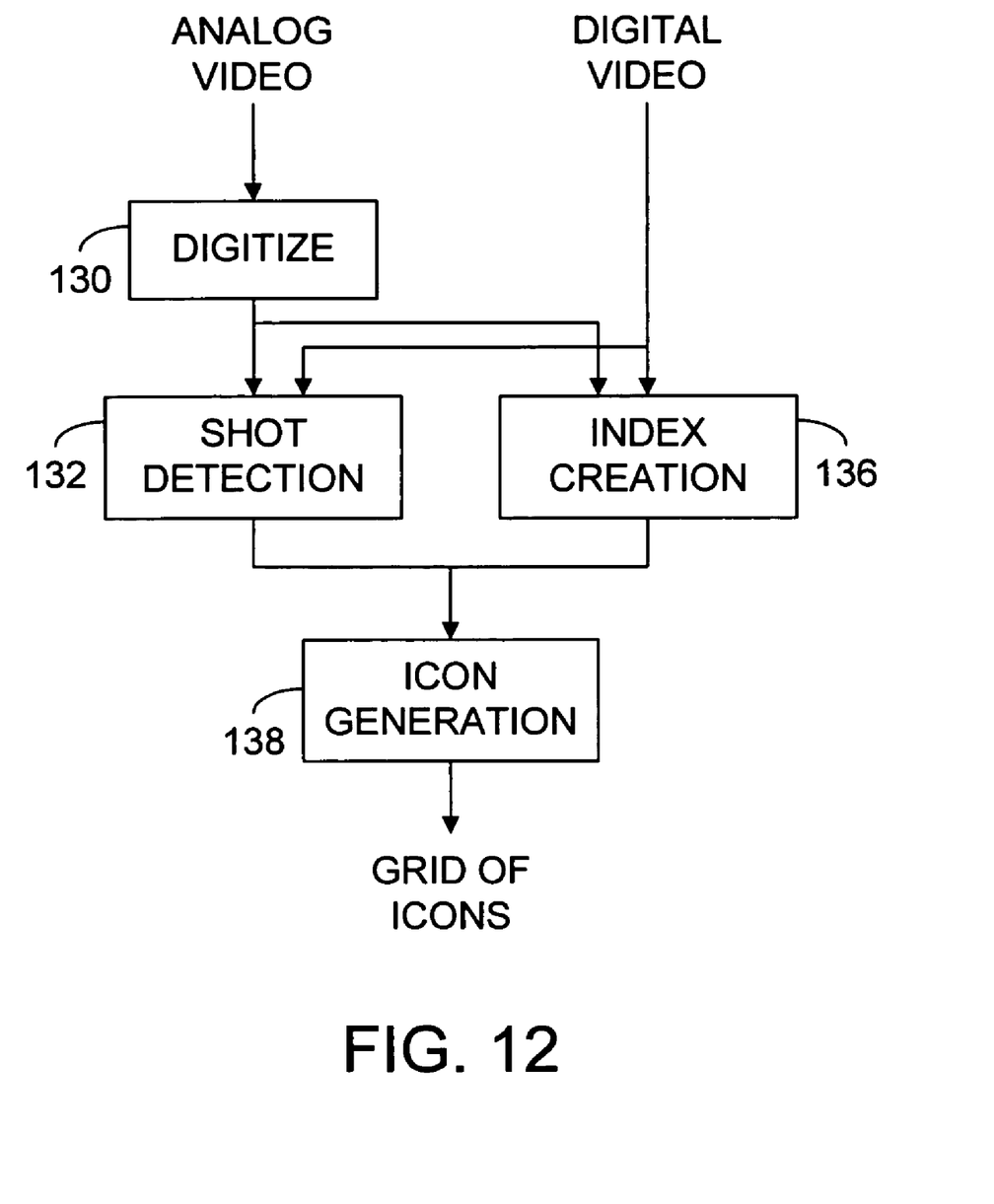
FIG. 12 is a flow diagram showing certain activities in the creation of a grid of shot frame icons.

FIG. 12 is a flow diagram of a process that may be used for creating an shot frame icon grid for a video stream. Given an analog video stream, a digitization process 130 converts the video signals into a digital format such as MPEG-1 or MPEG-2. If the video stream is already in a digital form, no digitization is needed. Shot detection is performed in block 132 on a digitized video stream. Any technique of shot detection can be used. However, it is preferred to use techniques that are faster-than-real-time, i.e., the process takes less than N minutes to detect the shot of an N-minute video. Indices are created in block 136 for random access purposes. For MPEG video in which there are frame-to-frame dependencies (P and B frames are created based on previous frames; I frames does not depend on other frames), the indices may include a file byte offset of the I frames, encoding type of each frame, which frame to decode before a current can be decoded, etc. The shot detection and index creation may be performed together in the same pass through the video stream. After shot detection and index creation, icons are generated in block 138.

Merely as an example, in a personal computer with a Pentium® III processor at 400 MHz, the rate to process MPEG-1 video encoded at 1.2 to 1.5 Mbits/sec may be about 200 frames/sec. The time includes shot detection (block 132), index creation (block 136), shot frame icon generation (block 138) and loading of the frame shot grid into a display interface. This may be effectively almost 7 times-faster-than-real-time speed.

The invention offers extremely simple interactions and editing of digital video streams. The paradigm is to treat video like a text document. Interactions with video are like interactions with text. This is in contrast to current video editing tools which force users to deal with the individual frames of video signals—this is tedious, time-consuming and non-intuitive for consumers.

A screen saver may be created by showing frames in different orders by re-arranging the shot order. The re-arranging may be truly random or pseudo-random.

Reference in the specification to "some embodiments" or "other embodiments" means that a particular feature, structure, or characteristic described in connection with the embodiments is included in at least some embodiments, but not necessarily all embodiments, of the invention. The various appearances of the term "some embodiments" in the description are not necessarily all referring to the same embodiments.

The term "responsive" and related terms mean that one signal or event is influenced to some extent by another signal or event, but not necessarily completely or directly. If the specification states a component, event, or characteristic "may", "might" or "could" be included, that particular component, event, or characteristic is not required to be included.

Those skilled in the art having the benefit of this disclosure will appreciate that many other variations from the foregoing description and drawings may be made within the scope of the present invention. Accordingly, it is the following claims including any amendments thereto that define the scope of the invention.

What is claimed is:

1. A method of editing a video stream, comprising:
   storing segment frame icons representing segments of the video stream, the segment frame icons having a layout, wherein the layout includes multiple rows of segment frame icons, and further wherein each segment of the video stream comprises a portion of the video stream representing related activity;
   displaying at least some of the segment frame icons;
   responding to signals from a user input device by selecting a first segment frame icon corresponding to a first segment of the video stream;
   displaying sub-shot frame icons representing frames of the first segment frame;
   responding to signals from the user input device by changing the layout of the sub-shot frame icons; and
   responding to signals from the user input device by replacing a current sub-shot frame icon with a new sub-shot frame icon that is more representative of the first segment.

2. The method of claim 1, wherein the segment frame icons are arranged in a two-dimensional grid.

3. The method of claim 1, wherein the segment frame icons includes an image derived from representative frames of the segments.

4. The method of claim 1, wherein changing the layout involves one or more of the following: re-arranging an order of the sub-shot frame icons in the layout, deleting at least one of the sub-shot frame icons, and adding at least one sub-shot frame icon from another video stream.

5. The method of claim 1, wherein the segment frame icons are shot frame icons representing shots of the video stream.

6. The method of claim 1, further comprising displaying a number with each sub-shot frame icon corresponding to a time the frame is shown.

7. The method of claim 1, wherein pointers are provided to designate a new order of playing the segments, without decoding and re-encoded according to a new layout.

8. The method of claim 1, further including detecting the segments from the video stream.

9. The method of claim 1, wherein the segment frame icons are shot frame icon representing shots of the video stream, and the method further comprises detecting the shots from the video stream.

10. The method of claim 1, furthering including detecting the segments from the video stream and concurrently creating indices for random access purposes.

11. The method of claim 1, wherein there are an equal number of segment frame icons in each of the rows.

12. An article comprising:
a computer readable medium having instructions therein which when executed cause a computer to edit a video stream by:
storing segment frame icons representing segments of the video stream, the segment frame icons having a layout, wherein the layout includes multiple rows of segment frame icons, and further wherein each segment of the video stream comprises a portion of the video stream representing related activity;
displaying at least some of the segment frame icons;
responding to signals from a user input device by selecting a first segment frame icon corresponding to a first segment of the video stream;
displaying sub-shot frame icons representing frames of the first segment frame;
responding to signals from the user input device by changing the layout of the sub-shot frame icons; and
responding to signals from the user input device by replacing a current sub-shot frame icon with a new sub-shot frame icon that is more representative of the first segment.

13. The article of claim 12, wherein the segment frame icons are arranged in a two-dimensional grid.

14. The article of claim 12, wherein the segment frame icons includes an image derived from representative frames of the segments.

15. The article of claim 12, wherein changing the layout involves one or more of the following: re-arranging an order of the sub-shot frame icons in the layout, deleting at least one of the sub-shot frame icons, and adding at least one sub-shot frame icon from another video stream.

16. The article of claim 12, wherein the segment frame icons are shot frame icons representing shots of the video stream.

17. The article of claim 12, further comprising displaying a number with each sub-shot frame icon corresponding to a time the frame is shown.

18. The article of claim 12, wherein pointers are provided to designate a new order of playing the segments, without decoding and re-encoded according to a new layout.

19. The article of claim 12, further including detecting the segments from the video stream.

20. The article of claim 12, wherein the segment frame icons are shot frame icons representing shots of the video stream, and the instructions further cause the computer to detect the shots from the video stream.

21. The article of claim 12, furthering including detecting the segments from the video stream and concurrently creating indices for random access purposes.

22. The article of claim 12, wherein there are an equal number of segment frame icons in each of the rows.

23. A computer system comprising:
a processor and video processing circuitry;
a display; and
memory including instructions which when executed cause the processor, video processing circuitry, and display to edit and display a video stream by:
displaying at least some of the segment frame icons;
responding to signals from a user input device by selecting a first segment frame icon corresponding to a first segment of the video stream;
displaying sub-shot frame icons representing frames of the first segment frame;
responding to signals from the user input device by changing the layout of the sub-shot frame icons; and
responding to signals from the user input device by replacing a current sub-shot frame icon with a new sub-shot frame icon that is more representative of the first segment.

24. The system of claim 23, wherein there are an equal number of segment frame icons in each of the rows.

* * * * *